United States Patent
Walpole et al.

(10) Patent No.: US 6,581,632 B2
(45) Date of Patent: Jun. 24, 2003

(54) AUTOMATIC VALVE

(75) Inventors: Jim Walpole, Plantation, FL (US); Greg Reback, Margate, FL (US)

(73) Assignee: Hoerbiger Kompressortechnik Services GmbH, Vienna (AT)

(*) Notice: Subject to any disclaimer, the term of this patent is extended or adjusted under 35 U.S.C. 154(b) by 0 days.

(21) Appl. No.: 09/819,000

(22) Filed: Mar. 28, 2001

(65) Prior Publication Data

US 2001/0039966 A1 Nov. 15, 2001

(30) Foreign Application Priority Data

Mar. 28, 2000 (AT) ............................................. 1522/2000

(51) Int. Cl.$^7$ ............................................. F16K 15/06
(52) U.S. Cl. ........................ 137/512.1; 137/514.5; 137/536; 137/543.19
(58) Field of Search .................. 137/512.1, 540, 137/543.19, 543.23, 536, 543.21, 543.13, 514.5

(56) References Cited

U.S. PATENT DOCUMENTS

| | | | | |
|---|---|---|---|---|
| 609,726 A | * | 8/1898 | Ball ........................ 137/512.1 |
| 717,029 A | * | 12/1902 | Reynolds ................ 137/512.1 |
| 976,010 A | * | 11/1910 | Thompson ............... 137/512.1 |
| 1,013,483 A | * | 1/1912 | Gaa ........................ 137/536 X |
| 1,176,651 A | * | 3/1916 | Chatain .................. 137/536 X |
| 1,886,205 A | * | 11/1932 | Lyford ................... 137/543.17 |
| 1,950,575 A | * | 3/1934 | Smolensky ............. 137/512.1 |
| 2,000,691 A | | 5/1935 | Collins |
| 2,624,587 A | * | 1/1953 | Watson et al. .......... 137/512.1 |
| 2,809,660 A | * | 10/1957 | Becker ................... 137/512.1 |
| 2,922,436 A | * | 1/1960 | Brash ..................... 137/536 X |
| 3,393,702 A | * | 7/1968 | Ferrill ....................... 137/536 |
| 3,556,137 A | * | 1/1971 | Billeter ................... 137/512.1 |
| 3,602,247 A | * | 8/1971 | Bunn et al. .............. 137/270 |
| 4,228,820 A | * | 10/1980 | Deminski ............ 137/514.5 X |
| 4,489,752 A | * | 12/1984 | Deminski ............... 137/512.1 |
| 4,515,179 A | * | 5/1985 | Edmunds et al. ...... 137/543.13 |
| 4,872,481 A | * | 10/1989 | Shaw et al. ............ 137/543.17 |
| 4,911,196 A | | 3/1990 | Kemp |
| 5,113,837 A | * | 5/1992 | Faull ..................... 137/536 X |
| 5,129,419 A | * | 7/1992 | Stapleton ............... 137/514.3 |
| 5,248,126 A | | 9/1993 | Prüss et al. |
| 5,511,583 A | * | 4/1996 | Bassett ................. 137/543.23 |
| 5,577,533 A | | 11/1996 | Cook |
| 5,873,385 A | | 2/1999 | Bloom et al. |
| 6,024,126 A | | 2/2000 | Miller et al. |

FOREIGN PATENT DOCUMENTS

| | | |
|---|---|---|
| EP | 0577831 | 12/1985 |
| EP | 0165316 | 1/1994 |
| FR | 944598 | 4/1949 |
| JP | 62-253974 | 11/1987 |

* cited by examiner

*Primary Examiner*—John Rivell
(74) *Attorney, Agent, or Firm*—Dykema Gossett PLLC

(57) ABSTRACT

In a poppet valve the guide attachment (2) of each sealing member (1) together with the spring (5) is arranged and supported in a cup-like suspension member (8) inserted in a continuous receiving bore (15) in the catcher plate (3) and is guided with its external periphery at least in part directly on the internal periphery of the suspension member (8), as a result of which the guide length of the sealing member (1) and thus the length of stroke thereof becomes independent of the thickness of the catcher plate (3). As a result, the production, assembly and storage are simplified and new fields of application for valves of this type are opened up.

16 Claims, 3 Drawing Sheets

AUTOMATIC VALVE

BACKGROUND OF THE INVENTION

1. Field of the Invention

The invention relates to an automatic valve, in particular for gas compressors, having at least one sealing member which is essentially designed in the form of a mushroom-shaped piston and which is guided by a guide attachment relative to a catcher plate in the stroke direction and is pre-stressed with a closure head by means of a spring against an opening sealed off in the opposite seating plate.

2. The Prior Art

Valves of this type are also referred to as poppet valves and are known for example from U.S. Pat. No. 2,624,587. With a suitable valve stroke, the individual valves or individual sealing members arranged in groups allow a satisfactory level of efficiency and a long service life as well as a simple stocking of spare parts, maintenance and assembly. The individual sealing members are suspended and guided and have the closure force introduced into them by way of bores in the catcher plate. Designs of this type have been found successful particularly in the case of slowly running reciprocating-piston compressors with a low compression ratio, since it is only in this class of compressor that it is possible in a simple manner to effect the large valve stroke which is necessary for this type of valve and which ensures a high level of efficiency. Problems have arisen in particular in the case of rapidly running compressors since the service life of the individual sealing members is adversely affected by the high opening and closing speeds.

Because of the lower manufacturing costs—as compared with annular or plate valves—also because of the simplified stocking of spare long time to use poppet valves of this type in other classes of compressors as well, in which case, however, difficulties have always arisen with the large valve strokes required for an efficiently operating valve of this type or the high opening and closing speeds associated therewith. In addition, because of the guide length of the sealing members required in the length of stroke the catcher plate has to be made very thick, and this results in an undesired increase in the manufacturing costs, in particular of the catcher plate which in terms of mechanical stressing would need only a fraction of the thickness required for receiving, guiding and springing the sealing members.

The problems mentioned are solved in part in an arrangement known for example from U.S. Pat. No. 4,489,752 in that a central guide pin for the closure member is inserted in the catcher plate, as a result of which the guide length of the sealing member is independent of the thickness of the catcher plate. The reliable fastening of this guide pin in the catcher, however, requires an increased level of care in production and assembly.

SUMMARY OF THE INVENTION

The object of the present invention is to improve a valve design of the type defined in the introduction, in such a way that the above-mentioned drawbacks of the known designs described are avoided and that, in particular, a simple and inexpensive design, manufacture and assembly, as well as use in fields of application previously closed to valves of this type are made possible.

This is attained according to the present invention in the case of a valve of the type defined in the introduction in that the guide attachment of the or each sealing member together with the spring is arranged and supported in a cup-like suspension member inserted in a continuous receiving bore in the catcher plate and is guided with its external periphery at least in part directly on the internal periphery of the suspension member. In this way, an individual cup-like suspension member with a guide length of any desired size can be inserted and also fastened in a supported manner in a thin—as compared with the length of stroke of the sealing members—catcher plate per individual sealing member in a simple manner, and this makes possible a light, material-saving design. In this way, guided lengths of stroke—of any desired size within wide boundaries—of the sealing members can be produced in a simple and advantageous manner, the modular design ensuring a simple assembly and maintenance as well as stocking of spare parts.

In accordance with a particularly preferred embodiment of the invention, it is provided that, in order to limit the stroke of the sealing member, the guide attachment thereof cooperates at its end remote from the closure head with a stop on the base of the suspension member. In this way, an impact—resilient to a certain degree—of the opening closure member upon the catcher occurs over the length of the cup-like suspension member between its retention in the catcher plate and the atop, and this reduces the stressing of the components and contributes to an increase in the service life, and particularly of course in the case of suspension members of plastics material or similarly resilient materials.

In a preferred embodiment of the invention the suspension member can be inserted into the catcher plate from the side of the seating plate and can be fixed thereon by means of a fastening member preferably constructed in the form of a snap or screw design. On the one hand this ensures that even if the fastening becomes loose, the cup-like suspension member cannot fall out of the catcher plate and lead to operating failures, whilst, on the other hand, a simple possibility of replacement is still retained.

In an additionally preferred embodiment of the invention the suspension member and/or the sealing member can consist of plastics material not susceptible to impact, preferably glass- or carbon-fibre-reinforced PA (polyamides), PEEK (polyetheretherketone), PPS (polypheneline sulphide) or part-aromatic PA (polyamides), optionally with additives which improve the sliding properties, such as in particular $MoS_2$, PTFE (polytetrafluoroethylene) PFA (polyfluoroalkoxy) or graphite and can preferably be produced in the injection-moulding process. This makes possible robust and inexpensive designs of the wearing parts and thus opens up further cases of application.

In accordance with a particularly preferred further embodiment of the invention, the spring pre-stressing the sealing member can be constructed in one piece with the suspension member or the sealing member, and this allows a prevention of rotation to reduce problems of wear as well as a reduction of assembly costs in a simple manner.

The invention will be explained in greater detail below with reference to the embodiments illustrated diagrammatically in the drawings.

DETAILED DESCRIPTION OF THE PREFERRED EMBODIMENTS

Figure 3:
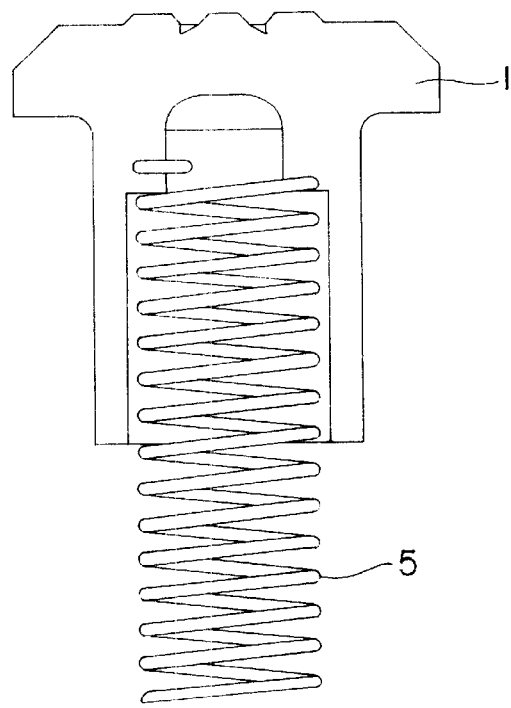
FIG. 3 is a side view of a sealing member and a spring in the inventive valve when constructed as a one-piece unit.
Figure 4:
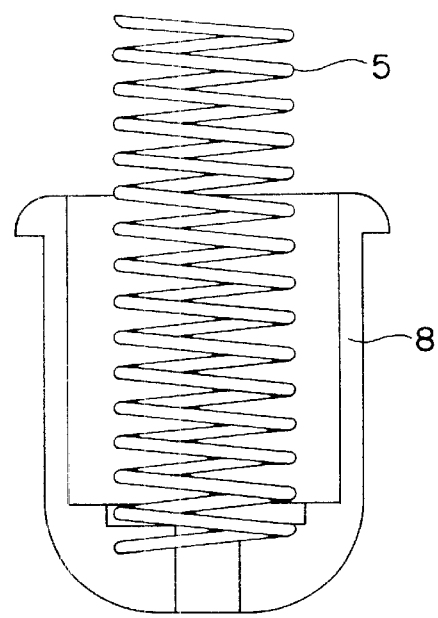
FIG. 4 is a side view of a spring and a suspension member in the inventive valve when constructed as a one-piece unit.
Figure 5:
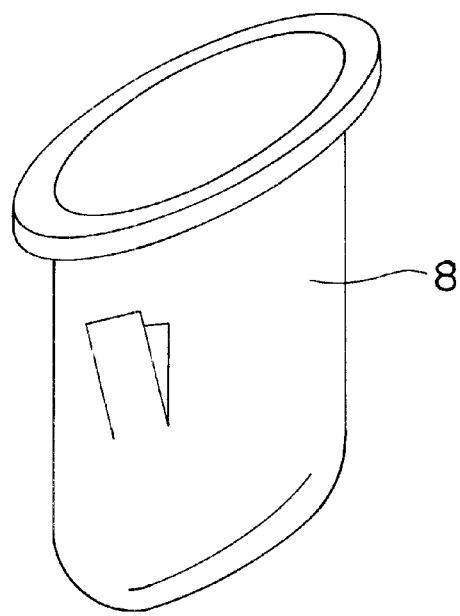
FIG. 5 is a perspective view of a suspension member having snap means for fixed positioning in a receiving base of a catcher plate.

The two valves illustrated can be used for example as the suction or pressure valve of a reciprocating-piston compressor for gases. A plurality of sealing members 1 are provided in each case, which are designed essentially in the form of mushroom-shaped pistons and which are guided in the stroke direction by a substantially hollow-cylindrical guide attachment (generally hollow cylindrical base) 2 relative to a catcher plate 3 and are each pre-stressed separately with a closure head (enlarged head) 4 by means of a spring 5 against an aligned opening 7 sealed off in the opposite seating plate 6. In order to be able to make the guided length of the sealing members 1 and thus the achievable length of stroke independent of the thickness of the catcher plate 3, the guide attachment 2 of each sealing member 1 together with the spring 5 is arranged in a cup-like suspension member 8 inserted in a continuous receiving bore 15 in the catcher plate 3 and is guided with its external periphery directly on the internal periphery of the suspension member 8. The inner space 9—receiving the spring 5—between the sealing member 1 and the suspension member 8 is ventilated by way of a bore 10 in the base 11 of the suspension member 8. Each sealing member can be interconnected as one piece with the associated spring (see FIG. 3) or each spring can be interconnected as one piece with each suspension member (see FIG. 4).

Figure 6:
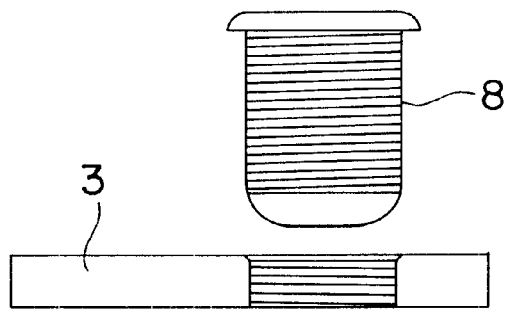
FIG. 6 is a side view of a suspension member having screw threads for fixed positioning in a receiving bore of a catcher plate.

The suspension member 8 is inserted into the catcher plate 3—dilled, precision-blanked or even cut by laser for example—from the side of the seating plate 6 and is fixed thereon by means of a fastening member constructed for example in the form of a snap (as shown in FIG. 6) design, which facilitates production, assembly and maintenance.

The suspension member and optionally also the sealing member 1 itself can consist of plastics material, for example glass- or carbon-fibre-reinforced PA, PEEK, PPS or part-aromatic PA, optionally with additives 4 which improve the sliding properties, such as in particular $MoS_2$, PTFE, PFA or graphite and can preferably be produced in the injection-moulding process. In this case the possibility of injection-moulding the spring 5 integrally with either the suspension member 8 or the sealing member 1 is also particularly advantageous, since this allows a further simplification of storage as well as assembly and maintenance, and, in addition, the stressing at the contact points of the respective individual parts by twisting of the components is also reduced.

Furthermore, reference should be made at this point to a spacer ring 12 which is illustrated in both figures and which is fixed with respect to the catcher plate 3 by means of a plurality of pins 13 and over the height of which an adaptation to the overall structural height of the valve can be carried out, so that this design can also be used in a very simple manner as a replacement for existing valves of this type with pre-set overall heights. For the sake of completeness, reference should also be made to an adjustment pin 14 which fixes the position between the seating plate 6 and the catcher plate 3.

Figure 1:
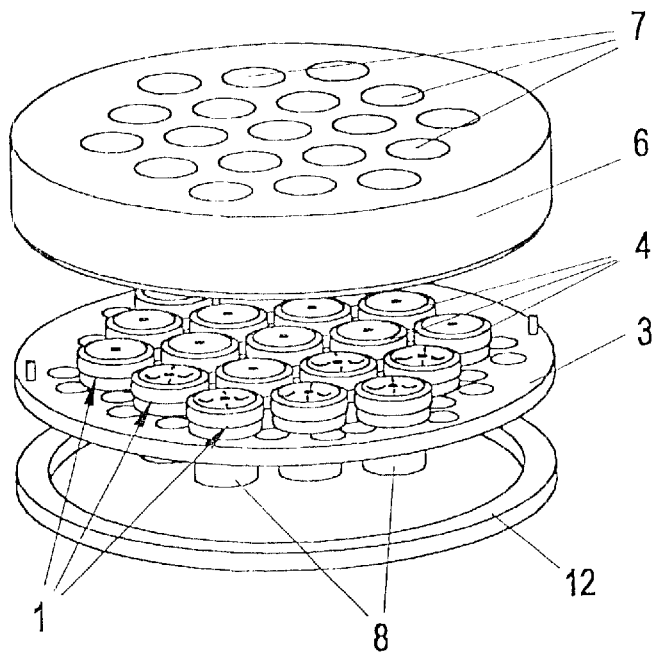
FIG. 1 is a perspective exploded view of a valve according to the invention.
Figure 2:
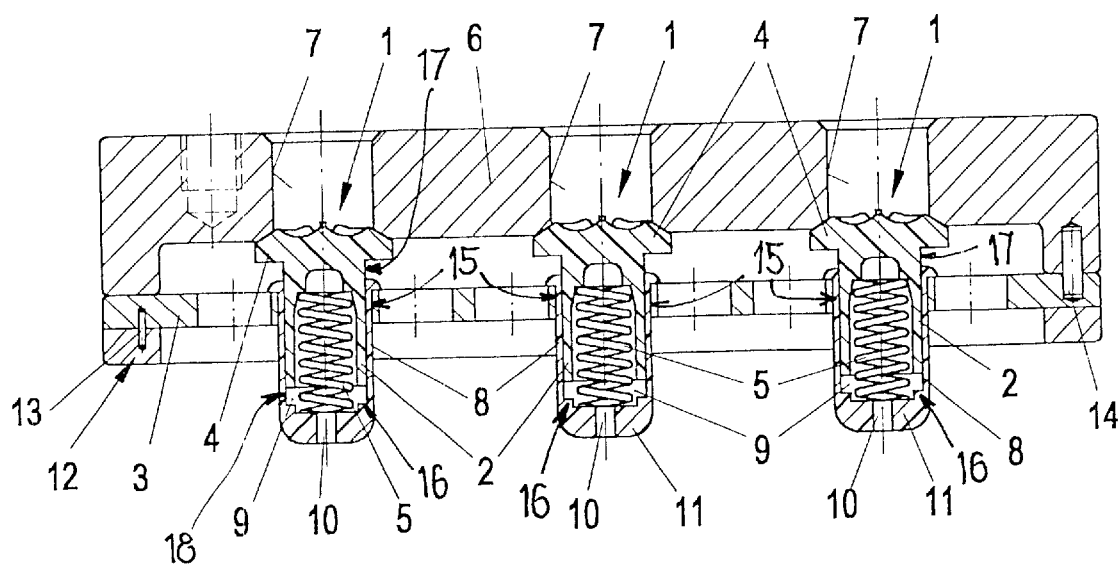
FIG. 2 is a cross-section through another embodiment.

Because of the arrangement—evident in particular in FIG. 2—of the sealing member 1 with the closure head 4 engaging within the cup-shaped suspension member 8, the guiding area between the guide attachment 2 and the suspension member 8 as well as the spring 5 situated inside are well protected against soiling. The relatively large guide diameter results in a highly stable guidance of the sealing members 1 even in the case of large strokes. The bore 10 as a pressure relief of the inner space 9 is not orientated directly into the gas flow, which effectively prevents oiling of the inner space 9.

If—as illustrated in FIG. 2—the distance 17 between the underside of the closure head 4 and the upper edge of the inserted cup-like suspension member 8 is greater than the distance 18 between the lower end of the closure member 2 remote from the closure head 4 and the stop 16 on the base 11 of the suspension member 8, a certain resilience occurs over the length of the suspension member 8 and this reduces the stressing during the impact of the closure member and thus prolongs the service life of the parts.

We claim:

1. An automatic valve for use with a gas compressor comprising:

a seating member which defines an opening therethrough through which gas can flow, a catcher plate positioned adjacent said seating member which defines a receiving bore therein which is aligned with said opening in said seating member, a cup-shaped suspension member positioned in said receiving bore of said catcher plate such that said suspension member is open towards said opening in the seating member, a sealing member which has an enlarged head and a generally hollow cylindrical base, the cylindrical base of said sealing member being located in said suspension member and the enlarged head thereof being located between said suspension member and said opening in the seating member, said cylindrical base of said sealing member contacting a sidewall and being guided within the suspension member to be movable towards and away from said seating member so that the enlarged head of the sealing member can block or unblock said opening in the seating member, said enlarged head being guided exclusively by said cylindrical base, and a spring member located within the cylindrical base of said sealing member and contacting a base of said suspension member to bias the sealing member towards said seating member so that the enlarged head thereof will block said opening in the seating member.

2. An automatic valve according to claim 1, wherein the cup-shaped suspension member includes a stop means at a base thereof, and the end of the cylindrical base of the sealing member opposite the enlarged head abuts said stop means to limit movement of the sealing member away from said seating member.

3. An automatic valve according to claim 2, wherein said suspension member includes an outlet hole in the base thereof.

4. An automatic valve according to claim 2, wherein said stop means is defined by an annular shoulder in the base of said suspension member.

5. An automatic valve according to claim 1, wherein said spring means comprises a helical spring.

6. An automatic valve according to claim 1, wherein said seating member comprises a plurality of openings therethrough, wherein said catcher plate includes a plurality of bores therein which are aligned with respective openings in said seating member, wherein said valve includes a plurality of cup-shaped suspension members which are each positioned in a respective bore in said catcher plate, wherein said valve includes a plurality of sealing members which are each positioned in and guided by a respective suspension member, and wherein said valve includes a plurality of spring members which are each located within a cylindrical base of a respective sealing member.

7. An automatic valve according to claim 1, wherein at least one of said suspension member and said sealing member are made of an impact-resistant plastic material.

8. An automatic valve according to claim 7, wherein said impact-resistant plastic material is selected from the group consisting of PA, PEEK, PPS and part-aromatic polyamide.

9. An automatic valve according to claim 8, wherein said impact-resistant plastic material includes a friction-reducing agent selected from the group consisting of $MoS_2$, PTFE, PFA and graphite.

10. An automatic valve according to claim 1, wherein said sealing member and said spring member are one-piece elements.

11. An automatic valve according to claim 1, wherein said suspension member and said spring member are one-piece elements.

12. An automatic valve according to claim 1, wherein said receiving bore extends through a thickness of said catcher plate.

13. An automatic valve according to claim 1, wherein said suspension member includes snap means to fixedly position said suspension member in said receiving bore.

14. An automatic valve according to claim 1, wherein said suspension member includes screw threads to fixedly position said suspension member in said receiving bore.

15. An automatic valve according to claim 1, wherein both said sealing member and said suspension member are composed of plastic.

16. An automatic valve according to claim 1, wherein said sealing member is one-piece.

* * * * *